United States Patent
Yan et al.

(10) Patent No.: US 11,012,313 B2
(45) Date of Patent: May 18, 2021

(54) APPARATUS, METHOD AND COMPUTER PROGRAM PRODUCT FOR TRUST MANAGEMENT

(71) Applicant: Nokia Technologies Oy, Espoo (FI)

(72) Inventors: Zheng Yan, Xi'an (CN); Shanshan Bian, Xi'an (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 16/603,810

(22) PCT Filed: Apr. 13, 2017

(86) PCT No.: PCT/CN2017/080428
§ 371 (c)(1),
(2) Date: Oct. 8, 2019

(87) PCT Pub. No.: WO2018/188019
PCT Pub. Date: Oct. 18, 2018

(65) Prior Publication Data
US 2020/0119992 A1 Apr. 16, 2020

(51) Int. Cl.
*H04L 12/24* (2006.01)
*H04L 12/26* (2006.01)
*H04L 29/06* (2006.01)

(52) U.S. Cl.
CPC .......... *H04L 41/0893* (2013.01); *H04L 41/12* (2013.01); *H04L 43/08* (2013.01); *H04L 43/12* (2013.01); *H04L 43/16* (2013.01); *H04L 63/1425* (2013.01); *H04L 63/20* (2013.01)

(58) Field of Classification Search
None
See application file for complete search history.

(56) References Cited

U.S. PATENT DOCUMENTS

| | | | | |
|---|---|---|---|---|
| 9,740,751 | B1* | 8/2017 | Yeom | G06F 16/24578 |
| 2006/0212925 | A1 | 9/2006 | Shull et al. | |
| 2008/0256612 | A1* | 10/2008 | Roy | H04L 63/08 726/5 |
| 2009/0049514 | A1 | 2/2009 | Yan et al. | |

(Continued)

FOREIGN PATENT DOCUMENTS

| CN | 101888328 A | 11/2010 |
|---|---|---|
| CN | 104753951 A | 7/2015 |

(Continued)

OTHER PUBLICATIONS

Scott-Hayward et al., "OperationCheckpoint: SDN Application Control", IEEE 22nd International Conference on Network Protocols, Oct. 21-24, 2014, pp. 618-623.

(Continued)

*Primary Examiner* — James A Edwards
(74) *Attorney, Agent, or Firm* — Laine IP Oy (57) ABSTRACT

Methods, apparatus, computer program product and computer readable medium are disclosed for trust management in software defined networking. A method comprises: collecting network performance results after a network policy issued by an application is applied; collecting a feedback for the network policy; and calculating a trust value of the application based at least partly on the network performance results and the feedback.

20 Claims, 7 Drawing Sheets

(56) References Cited

U.S. PATENT DOCUMENTS

| | | | | |
|---|---|---|---|---|
| 2009/0138960 | A1* | 5/2009 | Felty | G06N 5/025 |
| | | | | 726/14 |
| 2009/0185685 | A1* | 7/2009 | DeRobertis | H04L 9/0838 |
| | | | | 380/259 |
| 2011/0179477 | A1* | 7/2011 | Starnes | H04L 63/12 |
| | | | | 726/9 |
| 2013/0111547 | A1* | 5/2013 | Kraemer | G06F 21/56 |
| | | | | 726/1 |
| 2014/0075498 | A1* | 3/2014 | Porras | H04L 63/107 |
| | | | | 726/1 |
| 2014/0193154 | A1* | 7/2014 | Graham | H04L 43/14 |
| | | | | 398/79 |
| 2014/0351657 | A1* | 11/2014 | Madani | G06F 11/0781 |
| | | | | 714/47.1 |
| 2015/0135256 | A1* | 5/2015 | Hoy | H04L 63/0227 |
| | | | | 726/1 |
| 2015/0365436 | A1* | 12/2015 | Shenefiel | H04L 63/102 |
| | | | | 726/1 |
| 2015/0381526 | A1* | 12/2015 | Beaty | H04L 47/826 |
| | | | | 709/226 |
| 2016/0099963 | A1* | 4/2016 | Mahaffey | H04L 63/0227 |
| | | | | 726/25 |
| 2016/0210578 | A1* | 7/2016 | Raleigh | H04M 15/61 |
| 2017/0041231 | A1 | 2/2017 | Seed et al. | |
| 2017/0048242 | A1 | 2/2017 | Marquardt et al. | |

FOREIGN PATENT DOCUMENTS

| | | |
|---|---|---|
| CN | 106559408 A | 4/2017 |
| EP | 3079302 A1 | 10/2016 |
| WO | 2015/152869 A1 | 10/2015 |
| WO | 2016/026129 A1 | 2/2016 |

OTHER PUBLICATIONS

Shin et al., "FRESCO: Modular Composable Security Services for Software-Defined Networks", ISOC Network and Distributed System Security Symposium, 2013, 16 pages.

Kreutz et al., "Towards Secure and Dependable Software-Defined Networks", Proceedings of the second ACM SIGCOMM workshop on Hot topics in software defined networking, Aug. 16, 2013, pp. 55-60.

Chandrasekaran et al., "Tolerating SDN Application Failures with LegoSDN", Proceedings of the 13th ACM Workshop on Hot Topics in Networks, Oct. 27-28, 2014, pp. 1-7.

Ferguson et al., "Participatory Networking: An API for Application Control of SDNs", Proceedings of the ACM SIGCOMM 2013 conference on SIGCOMM, vol. 43, No. 4, Aug. 12-16, Oct. 2013, pp. 327-338.

Shin et al., "Rosemary: A Robust, Secure, and High-performance Network Operating System", Proceedings of the 2014 ACM SIGSAC Conference on Computer and Communications Security, Nov. 3-7, 2014, pp. 78-89.

Porras et al., "A Security Enforcement Kernel for OpenFlow Networks", Proceedings of the first workshop on Hot topics in software defined networks, Aug. 13, 2012, pp. 121-126.

Wen et al., "Towards a Secure Controller Platform for Openflow Applications", Proceedings of the second ACM SIGCOMM workshop on Hot topics in software defined networking, Aug. 16, 2013, pp. 171-172.

Yan et al., "A Security and Trust Framework for Virtualized Networks and Software-defined Networking", Security and Communication Networks, vol. 9, No. 16, Nov. 2016, pp. 3059-3069.

Yan et al., "A Mechanism for Trust Sustainability among Trusted Computing Platforms", International Conference on Trust, Privacy and Security in Digital Business, 2004, 10 pages.

Polcak et al., "High Level Policies in SDN", International Conference on E-Business and Telecommunications, 2015, pp. 39-57.

International Search Report and Written Opinion received for corresponding Patent Cooperation Treaty Application No. PCT/CN2017/080428, dated Jan. 3, 2018, 11 pages.

Betge-Brezetz et al., "Trust Support for SDN Controllers and Virtualized Network Applications", Proceedings of the 1st IEEE Conference on Network Softwarization (NetSoft), Apr. 13-17, 2015, 5 pages.

Lara et al., "OpenSec: Policy-Based Security Using Software-Defined Networking", IEEE Transactions on Network and Service Management, vol. 13, No. 1, Mar. 2016, pp. 30-42.

* cited by examiner

APPARATUS, METHOD AND COMPUTER PROGRAM PRODUCT FOR TRUST MANAGEMENT

RELATED APPLICATION

This application was originally filed as Patent Cooperation Treaty Application No. PCT/CN2017/080428 filed Apr. 13, 2017.

FIELD OF THE INVENTION

Embodiments of the disclosure generally relate to data processing, and more particularly, to trust management in software defined networking.

BACKGROUND

Software Defined Networking (SDN) is an emerging network paradigm that enables network administrators to configure network resources very quickly and adjust network-wide traffic flows to dynamically meet changing needs. A prominent feature of SDN is that it physically separates the forwarding functionality of forwarding devices, known as a data plane, from a control element such as controller, known as a control plane. The management of the entire network may rely on a logically centralized control plane with no need to consider a type of underlying devices (for example, router, switch, firewall, etc.). This new kind of networking mechanism ignores the difference between the underlying network devices, and gives the operators a very simple way to manage the network by programming new network functions through Application Programming Interfaces (APIs).

In spite of many advanced attributes such as centralized control and network programmability, SDN also introduces many security threats. Applications in SDN's application plane are programs that directly and programmatically communicate their network requirements and desired network behaviors to the control plane via a northbound interface. In general, the controllers in a SDN system may have no ability to distinguish the applications' eligibility, legality and trustworthiness by themselves. Beyond that, a poorly designed or buggy application may unintentionally bring a series of new vulnerabilities to the SDN system. Therefore, how to manage the trust of a huge number of applications becomes an urgent problem.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to first aspect of the disclosure, it is provided a method for trust management in software defined networking. Said method may comprises: collecting network performance results after a network policy issued by an application is applied; collecting a feedback for the network policy; and calculating a trust value of the application based at least partly on the network performance results and the feedback.

According to second aspect of the disclosure, it is provided an apparatus for trust management in software defined networking. Said apparatus may comprise at least one processor; at least one memory including computer program code, the memory and the computer program code configured to, working with the at least one processor, cause the apparatus to: collect network performance results after a network policy issued by an application is applied; collect a feedback for the network policy; and calculate a trust value of the application based at least partly on the network performance results and the feedback.

According to third aspect of the present disclosure, it is provided an apparatus for trust management in software defined networking. Said apparatus may comprise means configured to collect network performance results after a network policy issued by an application is applied; means configured to collect a feedback for the network policy; and means configured to calculate a trust value of the application based at least partly on the network performance results and the feedback.

According to fourth aspect of the present disclosure, it is provided a computer program product embodied on a distribution medium readable by a computer and comprising program instructions which, when loaded into a computer, execute the following: collect network performance results after a network policy issued by an application is applied; collect a feedback for the network policy; and calculate a trust value of the application based at least partly on the network performance results and the feedback.

According to fifth aspect of the present disclosure, it is provided a non-transitory computer readable medium having encoded thereon statements and instructions to cause a processor to execute the following: collect network performance results after a network policy issued by an application is applied; collect a feedback for the network policy; and calculate a trust value of the application based at least partly on the network performance results and the feedback.

According to sixth aspect of the disclosure, it is provided a method for trust management in software defined networking. Said method may comprises: receiving a network policy issued by an application; obtaining a trust value of the application, wherein the trust value is calculated by a trust evaluation apparatus based at least partly on network performance results and a feedback for the network policy; determining whether the trust value is higher than a threshold value; in response to a positive determination, checking whether the network policy conflicts with an applied network policy; if the network policy conflicts with the applied network policy, determining whether to apply the network policy based on a priority of the application; or if the network policy does not conflict with the applied network policy, applying the network policy.

According to seventh aspect of the disclosure, it is provided an apparatus for trust management in software defined networking. Said apparatus may comprise at least one processor; at least one memory including computer program code, the memory and the computer program code configured to, working with the at least one processor, cause the apparatus to: receive a network policy issued by an application; obtain a trust value of the application, wherein the trust value is calculated by a trust evaluation apparatus based at least partly on network performance results and a feedback for the network policy; determine whether the trust value is higher than a threshold value; in response to a positive determination, check whether the network policy conflicts with an applied network policy; when the network policy conflicts with the applied network policy, determine whether to apply the network policy based on a priority of the application; or when the network policy does not conflict with the applied network policy, apply the network policy.

According to eighth aspect of the present disclosure, it is provided an apparatus for trust management in software defined networking. Said apparatus may comprise means configured to receive a network policy issued by an application; means configured to obtain a trust value of the application, wherein the trust value is calculated by a trust evaluation apparatus based at least partly on network performance results and a feedback for the network policy; means configured to determine whether the trust value is higher than a threshold value; means configured to, in response to a positive determination, check whether the network policy conflicts with an applied network policy; means configured to, when the network policy conflicts with the applied network policy, determine whether to apply the network policy based on a priority of the application; or means configured to, when the network policy does not conflict with the applied network policy, apply the network policy.

According to ninth aspect of the present disclosure, it is provided a computer program product embodied on a distribution medium readable by a computer and comprising program instructions which, when loaded into a computer, execute the following: receive a network policy issued by an application; obtain a trust value of the application, wherein the trust value is calculated by a trust evaluation apparatus based at least partly on network performance results and a feedback for the network policy; determine whether the trust value is higher than a threshold value; in response to a positive determination, check whether the network policy conflicts with an applied network policy; when the network policy conflicts with the applied network policy, determine whether to apply the network policy based on a priority of the application; or when the network policy does not conflict with the applied network policy, apply the network policy.

According to tenth aspect of the present disclosure, it is provided a non-transitory computer readable medium having encoded thereon statements and instructions to cause a processor to execute the following: receive a network policy issued by an application; obtain a trust value of the application, wherein the trust value is calculated by a trust evaluation apparatus based at least partly on network performance results and a feedback for the network policy; determine whether the trust value is higher than a threshold value; in response to a positive determination, check whether the network policy conflicts with an applied network policy; when the network policy conflicts with the applied network policy, determine whether to apply the network policy based on a priority of the application; or when the network policy does not conflict with the applied network policy, apply the network policy.

These and other objects, features and advantages of the disclosure will become apparent from the following detailed description of illustrative embodiments thereof, which is to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
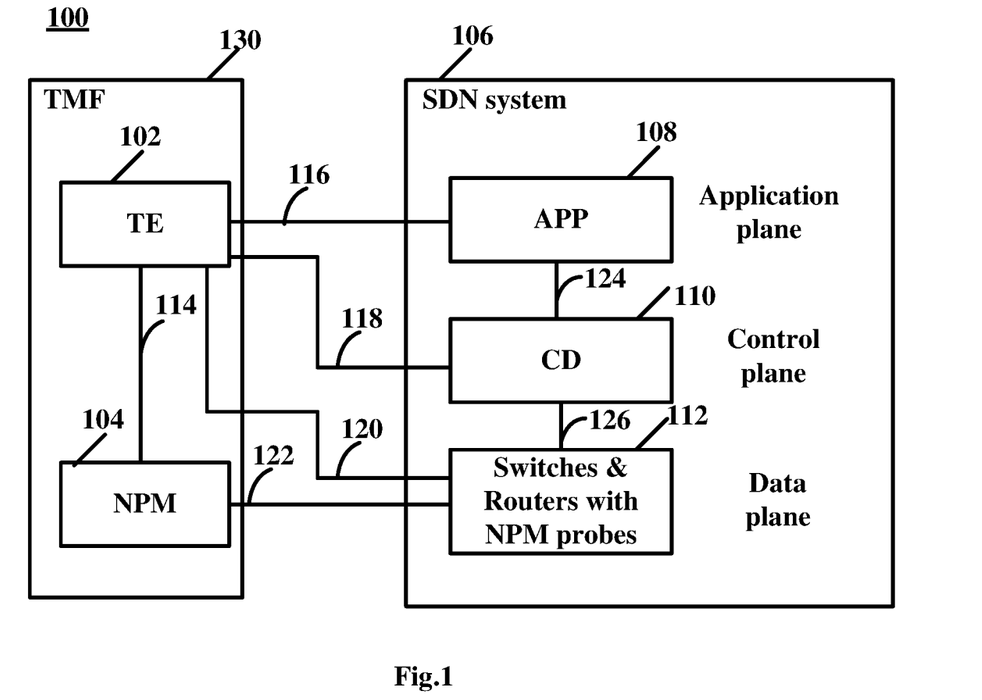
FIG. 1 depicts a schematic system architecture, in which some embodiments of the present disclosure can be implemented.

FIG. 1 depicts a schematic system architecture, in which some embodiments of the present disclosure can be implemented. As shown in FIG. 1, the system architecture 100 comprises a SDN system 106. It is noted that the SDN system may employ any suitable existing or future technologies or protocol such as OpenFlow, OpenDaylight, network virtualization platform etc. In general, the SDN system 106 may comprise three layers: an application plane, a control plane and a data plane.

The application plane may contain a number of SDN applications (APPs) 108. The SDN APPs are programs that explicitly, directly, and programmatically communicate their network requirements and desired network behavior to a SDN control plane or controller via a northbound interface (NBI) 124. The application plane may be used to configure network functions. A network policy or flow rule may be generated in the application plane and embodied into the control plane.

The control plane or controller may generate data forwarding commands based on a selected flow rule or network policy to instruct the data forwarding in the data plane via a south interface 126. The controller is a logically centralized entity that may be in charge of translating the requirements from the SDN application plane down to the data plane and providing the SDN applications with an abstract view of the network that may include statistics and events. The control plane may formulate protocols that are used to update the forwarding tables of the data plane devices such as switches, routers and/or firewalls. A conflict detection (CD) module/apparatus 110 may be added in the control plane, which is used to detect whether a new network policy or flow rule conflicts with an existing/applied one. The CD module 110 may decide which flow rule/network policy may be selected and applied based on a priority level derived from a trust value of an application.

The data plane mainly comprises forwarding devices 112 (either hardware or software or both) such as routers, switches, firewalls, etc. The forwarding devices 112 may forward data packets based on flow tables managed by the control plane (e.g., the forwarding commands provided by the control plane). The data plane may forward data flows, collect network information, and send network status to the control plane.

The system architecture 100 may further comprise a trust management framework (TMF) 130 which may contain two modules/apparatus: a network performance monitor (NPM) module/apparatus 104 and a trust evaluation (TE) module/apparatus 102.

NPM module 104 may comprise a plurality of probes configured to monitor the performance of network polices or flow rules issued by different SDN applications after they are carried out and fulfilled. The probes (either hardware or software or both) may be located in any suitable places of the data plane in the network and trusted by the TMF 130 for fulfilling the network performance monitoring. In an embodiment, NPM module 104 may apply a trust sustainment and control mechanism to manage the probes to ensure its network monitoring and related data collection are performed in a trustworthy way as expected by the TMF, for example, a protocol as described in Z. Yan, P. Zhang, A. V. Vasilakos, "A Security and Trust Framework for Virtualized Networks and Software-Defined Networking", Security and Communication Networks, Wiley, 9(16), pp. 3059-3069 November 2016. Doi: 10.1002/sec.1243 and Z. Yan, P. Cofta, "A mechanism for trust sustainability among trusted computing platforms", the First International Conference on Trust and Privacy in Digital Business (TrustBus'04), LNCS 3184, pp. 11-19, Spain, September 2004, both of which are incorporated by reference herein in its their entirety as part of the present application.

The probes may monitor the network performance in terms of throughput rate, packet loss probability, time delay and so on after a flow rule or network policy is applied. These monitoring results may be sent to TE module 102 with corresponding tags that indicate an application that issues the flow rule or network policy.

By collecting the above monitoring results and also a feedback from the control plane and/or other system entities, TE module 102 may calculate a trust value of the application that issue the flow rule or network policy. TE module 102 may issue the trust value of the application based on its evaluation to the control plane in order to assist the control plane's selection and decision on the flow rules or network policies provided by different applications.

For example, before an application communicates its network requirements and desired network behaviors (i.e. network policy or flow rule) to the control plane, it may send a request to TE module 102 to obtain a trust value of this application, wherein the trust value may be signed by TE module 102 with TE module 102's private key. Then the application may send its network policy or flow rule and the certified trust value to the control plane.

As another embodiment, if the control plane receives a flow rule or network policy from an application but the application does not attach its trust value certified by TE module 102 or the trust value is not certified by TE module 102, the control plane may send a request to TE module 102 to obtain the trust value of the application, wherein the trust value may be signed by TE module 102.

In addition, the communication between any two entities above may be a secured communication. The network performance results may be signed by the network performance results' provider, for example, the data collected by the probes may be signed and cannot be denied by their provider. In addition, the flow rule or network policy may be signed by the application. Any applications in the application plane can authenticate themselves with the control plane, e.g., by applying a public key cryptosystem. The identity management of the system may be based on Public Key Cryptosystem. The public key of the system entity represents its unique identifier.

It is noted that TMF 130 may be located inside the control plane or in a trusted third party and shared by a plurality of control planes. In addition, TE module 102 and NPM 104 may be integrated into an entity or distributed and managed by different entities.

In addition, the SDN system 106 may comprise a plurality of control planes, each of which may mange a part of network, and an SDN APP may provide its flow rules or network policies to the plurality of control planes.

TE module 102 and NPM module 104 can be implemented in form of hardware, software or their combination, including but not limited to, server, desktop computer, laptop computer, cloud computer, Internet/network node, communicator, service software, or any combination thereof. For example, TE module 102 and NPM module 104 may be deployed as a cloud service.

As shown in FIG. 1, the links 114, 116, 118, 120, 122, 124 and 126 may be secure channels. For example, the security channels may be established between each two parties in the system architecture 100 by applying a secure communication protocol, e.g., transport layer security (TLS), Secure Sockets Layer (SSL), OpenSSL, Hypertext Transfer Protocol (HTTP) over TLS, HTTP over SSL, and HTTP Secure (HTTPS), etc.

Figure 2:
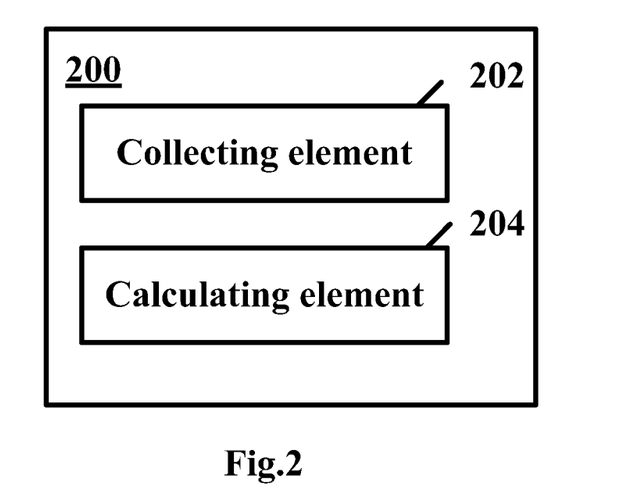
FIG. 2 shows a simplified block diagram of an apparatus for trust management in SDN according to an embodiment of the present disclosure.

FIG. 2 shows a simplified block diagram of an apparatus 200 for trust management in SDN according to an embodiment of the present disclosure. The apparatus 200 can be implemented as TE module 102 as shown in FIG. 1.

With reference to FIG. 2, the apparatus 200 may include a collecting element 202 configured to collect network performance results after a network policy issued by an application is applied. The network performance results may be the network performance results of a forwarding device and/or whole network performance results. In an embodiment, the network performance results may comprise at least one of throughput rate, packet loss probability, time delay, etc.

For example, the collecting element 202 may collect network performance results from one or more probes located in the data plane of SDN. In an embodiment, the probes may be managed by NPM 104 as described above. In another embodiment, the network performance results may be provided by the control plane or controller, for example, the controller may collect network performance results of a forwarding device or whole network performance results after the network policy issued by the application is applied. The network performance results may be monitored for a predefined time duration or until another flow rule or network policy is applied. In general, an identity of the application may be added in the network performance results, or the collecting element 202 may recognize the application that issues the underlying flow rule or network policy that links to network performance results. In addition, a timestamp may be added in the network performance results to indicate the length of time of network performance monitoring.

The collecting element 202 may further collect a feedback for the network policy. For example, the collecting element 202 may collect the feedback from at least one control plane of SDN or any other entities. The feedback may be an indication of influence of the network policy on the performance and/or security of whole network or individual forwarding device after the network policy is applied. For example, if the network policy has a good influence on the performance and/or security, then the feedback may be positive, otherwise the feedback may be negative. As an example, the feedback may be a score, and the more positive the feedback is, the higher the score is.

In an embodiment, the network performance results may be signed by the network performance results' providers. For example, if the network performance results are provided by a probe, then the probe may sign the network performance results with its private key such that the network performance results cannot be denied by their providers and the apparatus 200 can check whether the network performance results have been tampered with.

In an embodiment, an identity of the application may be added in the network performance results by the network performance results' provider. For example, NPM module 104 may inform a probe of the identity of the application when NPM module 104 instructs the probe to monitor network performance, then the probe may add the identity of the application in the network performance results. In another embodiment, the control plane may embed the identity of the application into its flow rules that are selected and applied into the data plane, and then the probes may know the identity of the application during the monitoring.

The apparatus may further comprise a calculating element 204 configured to calculate a trust value of the application based at least partly on the network performance results and the feedback. It is noted that the calculating element 204 may set an initial trust value of the application when the application issues the network policy for the first time. The following embodiment presents an example calculation of the trust value, but other formulas or algorithms can be applied in other embodiments.

$T_{i,c}$ denotes a trust value of application i at time c. $T_{i,c}$ may be contributed by two parts: the feedback from the control plane j (j=1, . . . , J) at time $c_j$, denoted as $Tf_{i,c}$ and the network performance results, denoted as $Tp_{i,c}$. The calculating element 204 may send a request to all control planes that have interactions with application i for feedback. After receiving the request, control plane j sends back its feedback $te_{j,i}$ in an honest way according to the statistical record of application i in terms of network status. For example, if application i's flow rules do not cause any network performance or security problems, $te_{j,i}$ is positive, otherwise, it is negative. Supposing the calculating element 204 receives in total of J feedback at time slot c. Then the calculating element 204 may aggregate all feedback by considering time impact (the more recent the feedback, the more valuable it is) and the value of J's impact (the bigger the value of J is, the more accurate the evaluation is) based on Formula (1):

$$Tf_{i,c} = \frac{\theta(J)}{J} \sum_{j=1}^{J} te_{j,i} \times e^{-\frac{|c-c_j|}{\tau}},$$

wherein $$\theta(J) = 1 - \exp\left(\frac{-J^2}{2(\sigma+\varepsilon)^2}\right)$$

the Rayleigh cumulative distribution function to model the impact of J on trust evaluation, $$\varepsilon = -\frac{J}{J'},$$

where parameter J' is the total number of control planes in the SDN system. Parameter τ is applied to control the decay of $te_{j,i}$ since the most recent feedback may contribute more on the trust evaluation.

For calculating $Tp_{i,c}$ based on the network performance results, the following algorithm may be applied to prepare the calculation.

Algorithm 1: Preparation of $Tp_{i,c}$ calculation
Input: Monitoring result of network throuput rate tr; packet loss probability lp; time delay td; a threshold value of network throughput rate TH_tr; a threshold value of packet loss probability TH_lp; a threshold value of time delay TH_td.
Po=0; Ne=0
If tr>TH_tr, Po++; else Ne++;
If lp>TH_lp, Po++; else Ne++;
If td<TH_td, Po++; else Ne++;
Output: Po and Ne.

After collecting all Po and Ne from all probes at time slot c, the calculating element 204 may check the tags (i.e., identity of the application) attached to Po and Ne with regard to application i (i=1, . . . , I) and then calculates $Tp_{i,c}$ by combining $Po_k$ and $Ne_k$ from probe k that contains tag i with Formula (2).

$$Tp_{i,c} = \frac{\sum_{k=1}^{K} Po_{k,i}}{\sum_{k=1}^{K} Po_{k,i} + \sum_{k=1}^{K} Ne_{k,i} + r}, \quad r \geq 1 \qquad (2)$$

where r is a parameter to ensure $0 \leq Tp_{i,c} < 1$ and Formula (2) is always valid. K is the total number of probes that provide monitoring result with regard to application i.

Finally, $Tf_{i,c}$ and $Tp_{i,c}$ may be aggregated together and past trust value $T_{i,c'}$ at a previous time slot c' also can be considered based on Formula (3).

$$T_{i,c} = \alpha T_{i,c'} + \beta Tf_{i,c} + \gamma Tp_{i,c} \qquad (3)$$

where α+β+γ=1, they are weighting parameters.

Figure 3:
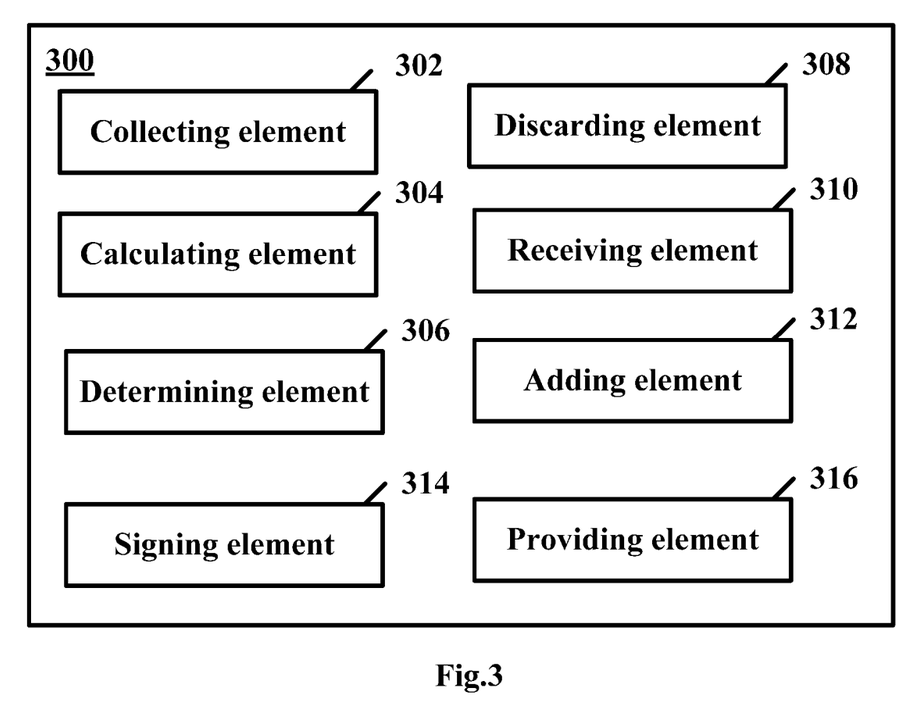
FIG. 3 shows a simplified block diagram of an apparatus for trust management in SDN according to another embodiment of the present disclosure.

FIG. 3 shows a simplified block diagram of an apparatus for trust management in SDN according to another embodiment of the present disclosure. The apparatus 300 can be implemented as TE module 102 as shown in FIG. 1. For some parts that have been described above with reference to FIG. 2, the description thereof is omitted herein for brevity.

With reference to FIG. 3, the apparatus 300 may include a collecting element 302 and a calculate element 304, wherein collecting element 302 may be configured to collect network performance results after a network policy issued by an application is applied and collect a feedback for the network policy, and the calculate element 304 is configured to calculate a trust value of the application based at least partly on the network performance results and the feedback. The functionalities of the collecting element 302 and the calculate element 304 are similar to that of the collecting element 202 and the calculate element 204 respectively, therefore the description thereof is omitted herein for brevity.

The apparatus 300 may further include a determining element 306 configured to determine whether at least one network performance monitor is in a trusted status, wherein the network performance results are monitored by the at least one network performance monitor; and a discarding element 308 configured to discard the network performance results of a network performance monitor if the network performance monitor is not in a trusted status.

For example, the network performance results may be collected from at least one network performance monitor located in the data plane of SDN and managed by a network performance monitor apparatus such as NPM module 104, the determining element 306 may check with the network performance monitor apparatus such as NPM module 104 to determine whether the at least one network performance monitor such as probe is in a trusted status, and the discarding element 308 may discard the network performance results of a network performance monitor if the network performance monitor is not in a trusted status.

In an embodiment, a trust sustainment and control protocol may be applied between NPM module 104 and the probe to ensure that each probe is working as expected. Once a probe is attacked or intruded, NPM module 104 may be informed. Therefore the determining element 306 may check with NPM module 104 to determine whether the probe is in a trusted status. If the probe is in a trusted status, the network performance results provided by the probe can be considered in the trust value calculation; otherwise, the network performance results provided by the probe may be discarded. In this way, it can ensure that only the trusted network performance results can be used in the trust value calculation, therefore it can improve the accuracy of trust value calculation.

In an embodiment, the network performance results' provider such as a probe may not know the identity of the application, therefore the identity of the application may not be added to the network performance results by the probe. In this case, the apparatus 300 may add the identity of the application to the network performance results by itself.

In this embodiment, the apparatus 300 may further comprise: a receiving element 310 configured to receive, from at least one control plane of SDN, an identity of the application and a time duration of the network policy; and an adding element 312 configured to add the identity of the application to the network performance results by matching the time duration with a time of network performance monitoring.

For example, when a network policy is received by a control plane such as controller, the control plane may know the identity of the application. If the network policy is selected and applied by the controller, then the controller may send periodically the identity of the application and the time duration of the network policy to the apparatus 300. Then the receiving element 310 may receive the identity of the application and the time duration of the network policy. The adding element 312 may match the time duration with the time of network performance monitoring, wherein the time of network performance monitoring may be embedded in the network performance results. In this way, the adding element 312 may recognize the network performance results and add the identity of the application to the network performance results.

In an embodiment, the apparatus 300 may further comprise a signing element 314 configured to sign the trust value; and a providing element 316 configured to provide the signed trust value to the application and/or the at least one control plane of SDN. By using the signed trust value, the application and/or the at least one control plane are able to detect whether the trust value has been tampered with. For example, when the application sends a network policy to a control plane such as controller, the application may attach a certified trust value signed by the signing element 314. In another example, when the application does not send a certified trust value or attach an uncertified trust value to the controller, the controller may retrieve the certified trust value from the signing element 314. After obtaining the certified trust value, the controller may verify the signature. If the verification fails, then the controller may reject the network policy, otherwise the controller may proceed to process the network policy.

Figure 4:
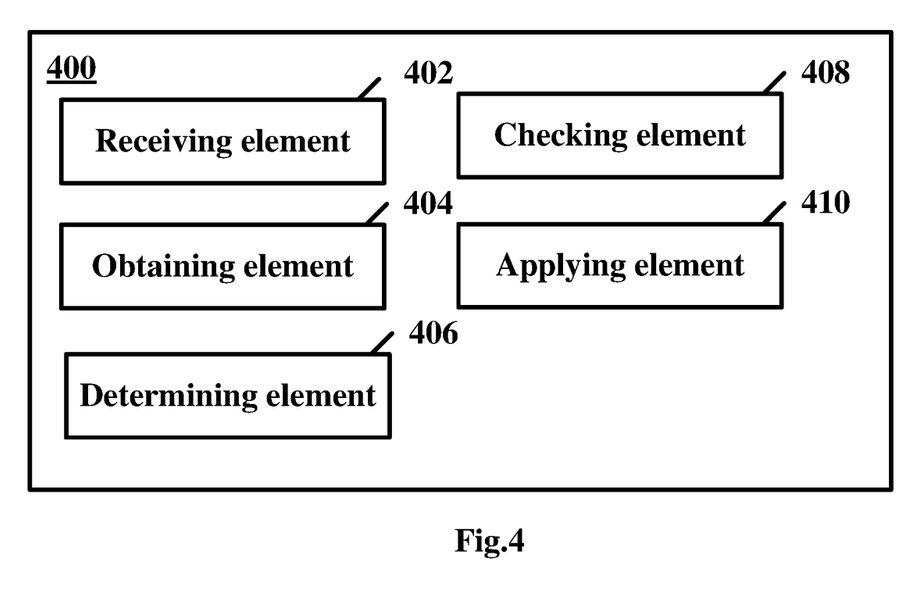
FIG. 4 shows a simplified block diagram of an apparatus for trust management in SDN according to still another embodiment of the present disclosure.

FIG. 4 shows a simplified block diagram of an apparatus 400 for trust management in SDN according to an embodiment of the present disclosure. The apparatus 400 can be implemented as a controller, a module thereof or an independent apparatus working with the controller.

With reference to FIG. 4, the apparatus 400 may comprise a receiving element 402 configured to receive a network policy issued by an application. For example, when the apparatus 400 is implemented as controller or a module thereof, the receiving element 402 may receive the network policy from the application through the northbound interface. If the apparatus 400 is an independent apparatus, the receiving element 402 may receive the network policy from the controller. In addition, the network policy may be signed by the application.

The apparatus 400 may further comprise an obtaining element 404 configured to obtain a trust value of the application, wherein the trust value is calculated by a trust evaluation apparatus based at least partly on network performance results and a feedback for the network policy. For example, the trust value may be calculated by the apparatus 200 or 300 based on the network performance results and the feedback for the network policy as described above.

In an embodiment, the trust value may be attached to the network policy issued by the application. For example, the apparatus 200 or 300 may send the trust value to the application, and then the application may attach the trust value to the network policy, wherein the trust value may be signed by the apparatus 200 or 300 as described above. In this case, the obtaining element 404 may obtain the trust value from the network policy.

In another embodiment, the trust value may not be attached to the network policy. For example, the application sends only the network policy to the controller. In this case, the obtaining element 404 may obtain the trust value from the trust evaluation apparatus such as apparatus 200 or 300. In addition, the trust value may be signed by the apparatus 200 or 300 as described above.

The apparatus 400 may further comprise a determining element 406 configured to determine whether the trust value is higher than a threshold value. The threshold value may be any suitable value, for example it may be determined by the operator. It is noted that an initial trust value of the application may be set by the trust evaluation apparatus such as apparatus 200 or 300 when the application issues the network policy for the first time, wherein the initial trust value may be higher than the threshold value. By using the threshold value, some malicious applications, poorly designed or buggy applications with a lower trust value may be rejected. In response to a positive determination (i.e., the trust value is higher than a threshold value), the apparatus 400 may further process the network policy, and otherwise the network policy may be rejected.

The apparatus 400 may further comprise a checking element 408 configured to check whether the network policy conflicts with an applied network policy in response that the trust value is higher than the threshold value. The checking element 408 may employ any suitable existing or future conflict detection techniques for network policy. In an embodiment, the checking element 408 may check whether the network policy conflicts with the applied network policy based on a source IP address, a destination IP address, a source port and a destination port.

In an embodiment, if the network policy conflicts with the applied network policy, the determining element 406 may determine whether to apply the network policy based on a priority of the application. The priority of the application may be determined by employing any suitable approaches. For example, the priority of the application may be determined by the types of applications. As an example, an administrator application and a security application may have higher priority than a third party application.

In an embodiment, if the priority of the application is higher than a priority of the applied network policy, then the applied network policy may be replaced with the network policy, wherein the priority of the applied network policy may be equal to a priority of the application issuing the applied network policy. If the priority of the application is lower than the priority of the applied network policy, then the network policy may be rejected. If the priority of the application is equal to the priority of the applied network policy, the applied network policy and the network policy may be sent to a network administrator for final decision or applying a decisive rule to automatically set a network policy in this situation.

In an embodiment, the apparatus 400 may further comprise an applying element 410 configured to apply the network policy if the network policy does not conflict with the applied network policy. For example, the applying element 410 may translate the network policy into any suitable forwarding rule(s) that can be used in the data plane.

Figure 5:
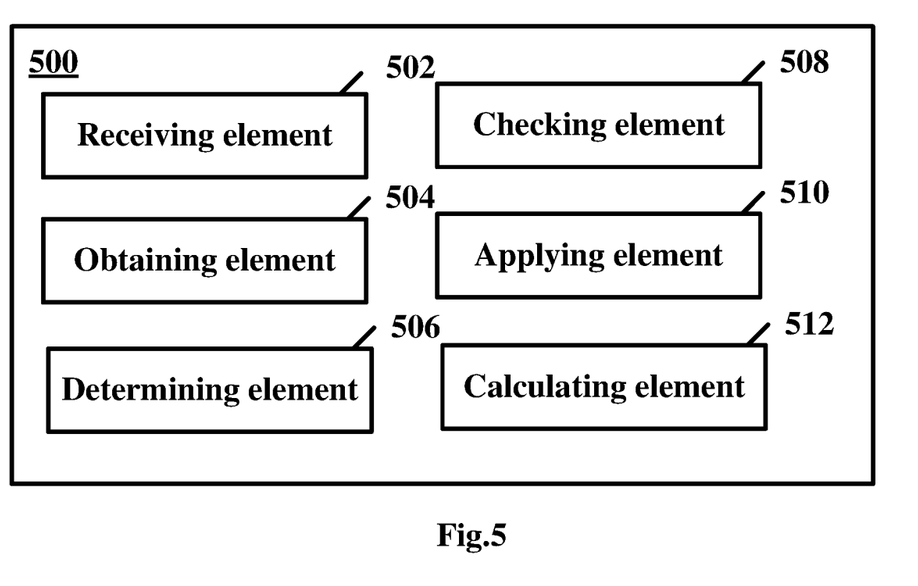
FIG. 5 shows a simplified block diagram of an apparatus for trust management in SDN according to still another embodiment of the present disclosure.

FIG. 5 shows a simplified block diagram of an apparatus for trust management in SDN according to another embodiment of the present disclosure. The apparatus 500 can be implemented as a controller, a module thereof or an independent apparatus working with the controller. For some parts that have been described above with reference to FIG. 4, the description thereof is omitted herein for brevity.

With reference to FIG. 5, the apparatus 500 may include a receiving element 502 configured to receive a network policy issued by an application; an obtaining element 504 configured to obtain a trust value of the application, wherein the trust value is calculated by a trust evaluation apparatus based at least partly on network performance results and a feedback for the network policy; a determining element 506 configured to determine whether the trust value is higher than a threshold value; a checking element 508 configured to, in response to a positive determination, check whether the network policy conflicts with an applied network policy; if the network policy conflicts with the applied network policy, the determining element 506 further configured to determine whether to apply the network policy based on a priority of the application; or if the network policy does not conflict with the applied network policy, an applying element 510 configured to apply the network policy. The functionalities of the receiving element 502, the obtaining element 504, the determining element 506, the checking element 508 and the applying element 510 are similar to that of the receiving element 402, the obtaining element 404, the determining element 406, the checking element 408 and the applying element 410 respectively, therefore the description thereof is omitted herein for brevity.

The apparatus 500 may further comprise a calculating element 512 configured to calculate the priority of the application based at least partly on the trust value. For example, the priority of the application $P_i$ may be calculated as $$P_i = F(T_i) \qquad (3)$$

wherein $T_i$ denotes application i's trust value. The bigger value of the $T_i$ is, the higher the $P_i$ is. Notably, $P_i$ may be also impacted by other factors, not only trust, thus function F( ) could take other inputs, such as application authority level, importance level, etc., into account in order to generate an accurate priority value.

Figure 6:
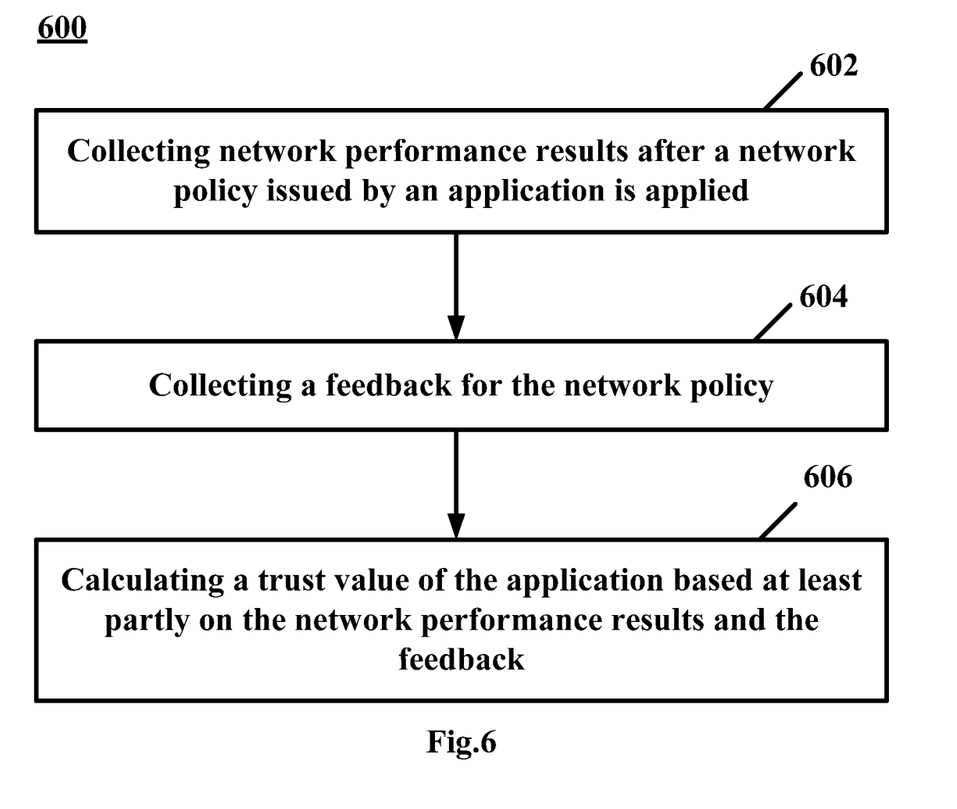
FIG. 6 is a flow chart showing a method for trust management in SDN according to an embodiment of the present disclosure.

Under the same inventive concept, FIG. 6 is a flow chart showing a method for trust management in SDN according to an embodiment of the present disclosure. The method 600 may be executed by apparatus 200 or 300. For same parts or functions as described in the previous embodiments, the description thereof is omitted for brevity.

As shown in FIG. 6, the method 600 may begin with step 601. At step 602, the apparatus 200 or 300 may collect network performance results after a network policy issued by an application is applied.

At step 604, the apparatus 200 or 300 may collect a feedback for the network policy.

At step 606, the apparatus 200 or 300 may calculate a trust value of the application based at least partly on the network performance results and the feedback.

Figure 7:
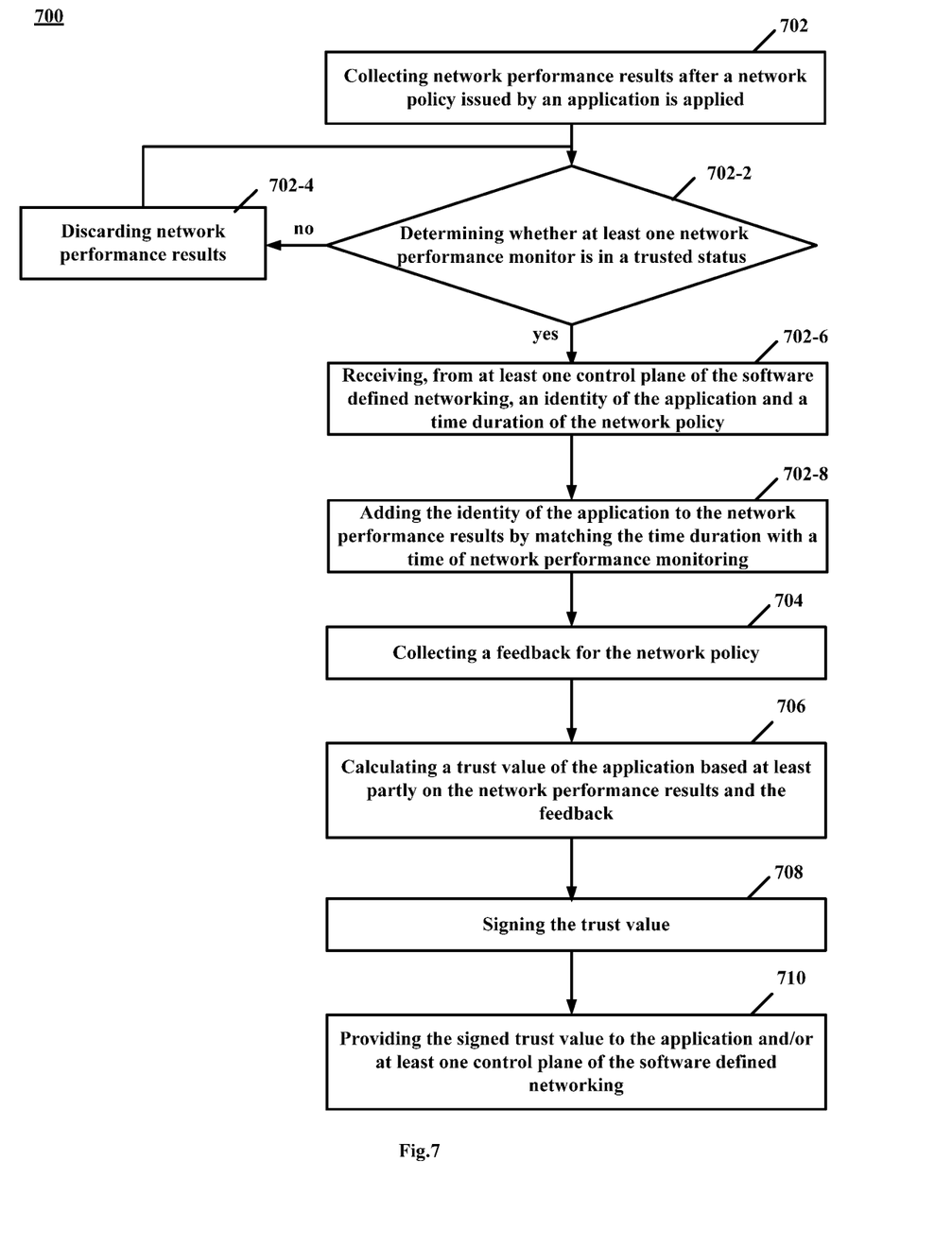
FIG. 7 is a flow chart showing a method for trust management in SDN according to another embodiment of the present disclosure.

Under the same inventive concept, FIG. 7 is a flow chart showing a method for trust management in SDN according to another embodiment of the present disclosure. The method 700 may be executed by apparatus 300. For same parts or functions as described in the previous embodiments, the description thereof is omitted for brevity.

As shown in FIG. 7, the method 700 may begin with step 702. At step 702, the apparatus 300 may collect network performance results after a network policy issued by an application is applied.

At step 702-2, the apparatus 300 may determine whether at least one network performance monitor is in a trusted status, wherein the network performance results are monitored by the at least one network performance monitor.

At step 702-4, the apparatus 300 may discard network performance results of a network performance monitor if the network performance monitor is not in a trusted status.

At step 702-6, the apparatus 300 may receive, from at least one control plane of the software defined networking, an identity of the application and a time duration of the network policy.

At step 702-8, the apparatus 300 may add the identity of the application to the network performance results by matching the time duration with a time of network performance monitoring.

At step 704, the apparatus 300 may collect a feedback for the network policy.

At step 706, the apparatus 300 may calculate a trust value of the application based at least partly on the network performance results and the feedback.

At step 708, the apparatus 300 may sign the trust value.

At step 710, the apparatus 300 may provide the signed trust value to the application and/or at least one control plane of the software defined networking.

In an embodiment, the at least one network performance monitor is located in a data plane of the software defined networking and managed by a network performance monitor apparatus, and a trust sustainment and control protocol is applied between the network performance monitor apparatus and the at least one network performance monitor.

In an embodiment, the network performance results are signed by the network performance results' provider.

In an embodiment, an identity of the application is added in the network performance results by the network performance results' provider.

In an embodiment, the network performance results comprise at least one of throughput rate, packet loss probability and time delay.

Figure 8:
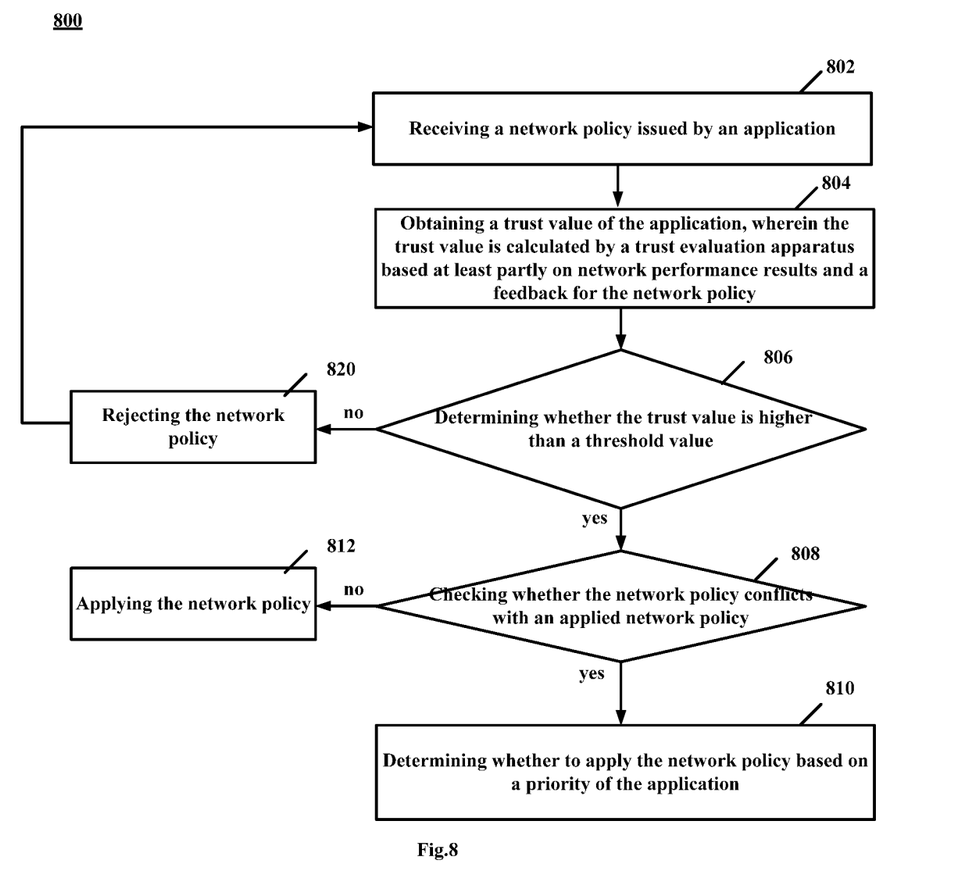
FIG. 8 is a flow chart showing a method for trust management in SDN according to still another embodiment of the present disclosure.

Under the same inventive concept, FIG. 8 is a flow chart showing a method for trust management in SDN according to an embodiment of the present disclosure. The method 800 may be executed by apparatus 400 or 500. For same parts or functions as described in the previous embodiments, the description thereof is omitted for brevity.

As shown in FIG. 8, the method 800 may begin with step 802. At step 802, the apparatus 400 or 500 may receive a network policy issued by an application.

At step 804, the apparatus 400 or 500 may obtain a trust value of the application, wherein the trust value is calculated by a trust evaluation apparatus based at least partly on network performance results and a feedback for the network policy.

At step 806, the apparatus 400 or 500 may determine whether the trust value is higher than a threshold value.

At step 808, the apparatus 400 or 500 may check whether the network policy conflicts with an applied network policy in response to the trust value being higher than a threshold value.

At step 820, the apparatus 400 or 500 may reject the network policy if the trust value is not higher than a threshold value.

At step 810, the apparatus 400 or 500 may determine whether to apply the network policy based on a priority of the application if the network policy conflicts with the applied network policy.

At step 812, the apparatus 400 or 500 may apply the network policy if the network policy does not conflict with the applied network policy.

Figure 9:
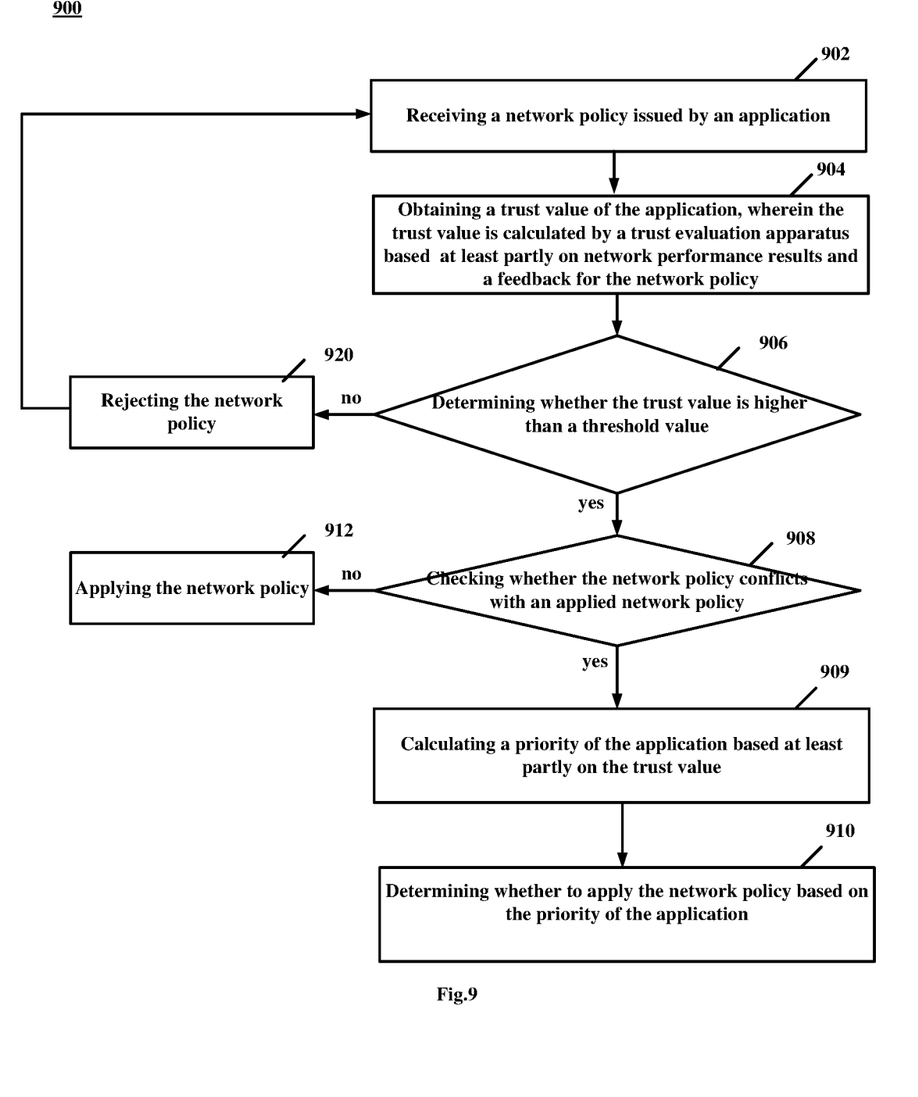
FIG. 9 is a flow chart showing a method for trust management in SDN according to still another embodiment of the present disclosure.

Under the same inventive concept, FIG. 9 is a flow chart showing a method for trust management in SDN according to another embodiment of the present disclosure. The method 900 may be executed by apparatus 500. For same parts or functions as described in the previous embodiments, the description thereof is omitted for brevity.

As shown in FIG. 9, the method 900 may begin with step 902. At step 902, the apparatus 500 may receive a network policy issued by an application.

At step 904, the apparatus 500 may obtain a trust value of the application, wherein the trust value is calculated by a trust evaluation apparatus based at least partly on network performance results and a feedback for the network policy.

At step 906, the apparatus 500 may determine whether the trust value is higher than a threshold value.

At step 908, the apparatus 500 may check whether the network policy conflicts with an applied network policy in response that the trust value is higher than a threshold value. In an embodiment, the apparatus 500 may check whether the network policy conflicts with the applied network policy based on a source IP address, a destination IP address, a source port and a destination port.

At step 920, the apparatus 500 may reject the network policy if the trust value is not higher than a threshold value.

At step 909, the apparatus 500 may calculate a priority of the application based at least partly on the trust value.

At step 910, the apparatus 500 may determine whether to apply the network policy based on the priority of the application if the network policy conflicts with the applied network policy.

In an embodiment, if the priority of the application is higher than a priority of the applied network policy, replace the applied network policy with the network policy; if the priority of the application is lower than the priority of the applied network policy, reject the network policy; or if the priority of the application is equal to the priority of the applied network policy, send the applied network policy and the network policy to a network administrator for final decision or applying a decisive rule to automatically set a network policy in this situation.

At step 912, the apparatus 500 may apply the network policy if the network policy does not conflict with the applied network policy.

In an embodiment, the network policy is signed by the application and the trust value is signed by the trust evaluation apparatus.

It is noted that any of the components of the apparatus 200, 300, 400 and 500 as depicted in FIG. 2-5 can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor or a chip. The method steps can then be carried out using the distinct software modules, as described above, executing on a hardware processor.

According to an aspect of the disclosure it is provided an apparatus for authentication. Said apparatus comprises means configured to collect network performance results after a network policy issued by an application is applied; means configured to collect a feedback for the network policy; and means configured to calculate a trust value of the application based at least partly on the network performance results and the feedback.

In an embodiment, the apparatus further comprises: means configured to determine whether at least one network performance monitor is in a trusted status, wherein the network performance results are monitored by the at least one network performance monitor; and means configured to discard network performance results of a network performance monitor if the network performance monitor is not in a trusted status.

In an embodiment, the at least one network performance monitor is located in a data plane of the software defined networking and managed by a network performance monitor apparatus, and a trust sustainment and control protocol is applied between the network performance monitor apparatus and the at least one network performance monitor.

In an embodiment, the network performance results are signed by the network performance results' provider.

In an embodiment, an identity of the application is added in the network performance results by the network performance results' provider.

In an embodiment, the apparatus further comprises: means configured to receive, from at least one control plane of the software defined networking, an identity of the application and a time duration of the network policy; and means configured to add the identity of the application to the network performance results by matching the time duration with a time of network performance monitoring.

In an embodiment, the network performance results comprise at least one of throughput rate, packet loss probability and time delay.

In an embodiment, the apparatus further comprises: means configured to sign the trust value; and means configured to provide the signed trust value to the application and/or at least one control plane of the software defined networking.

According to another aspect of the disclosure it is provided an apparatus for authentication. Said apparatus comprises means configured to receive a network policy issued by an application; means configured to obtain a trust value of the application, wherein the trust value is calculated by a trust evaluation apparatus based at least partly on network performance results and a feedback for the network policy; means configured to determine whether the trust value is higher than a threshold value; means configured to, in response to a positive determination, check whether the network policy conflicts with an applied network policy; means configured to, if the network policy conflicts with the applied network policy, determine whether to apply the network policy based on a priority of the application; or means configured to, if the network policy does not conflict with the applied network policy, apply the network policy.

In an embodiment, the apparatus further comprises: means configured to calculate the priority of the application based at least partly on the trust value.

In an embodiment, the apparatus further comprises: means configured to check whether the network policy conflicts with the applied network policy based on a source IP address, a destination IP address, a source port and a destination port.

In an embodiment, if the priority of the application is higher than a priority of the applied network policy, replace the applied network policy with the network policy; if the priority of the application is lower than the priority of the applied network policy, reject the network policy; or if the priority of the application is equal to the priority of the applied network policy, send the applied network policy and the network policy to a network administrator for final decision or apply a decisive rule to automatically set a network policy in this situation.

In an embodiment, the network policy is signed by the application and the trust value is signed by the trust evaluation apparatus.

Additionally, an aspect of the disclosure can make use of software running on a computing device. Such an implementation might employ, for example, a processor, a memory, and an input/output interface formed, for example, by a display and a keyboard. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, random access memory (RAM), read only memory (ROM), a fixed memory device (for example, hard drive), a removable memory device (for example, diskette), a flash memory and the like. The processor, memory, and input/output interface such as display and keyboard can be interconnected, for example, via bus as part of a data processing unit. Suitable interconnections, for example via bus, can also be provided to a network interface, such as a network card, which can be provided to interface with a computer network, and to a media interface, such as a diskette or CD-ROM drive, which can be provided to interface with media.

Accordingly, computer software including instructions or code for performing the methodologies of the disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The embodiments described in the present disclosure has the following advantages:

Effectiveness: The embodiments can solve the lack of trust between the applications in the application plane and the controllers in the control plane. It offers a trust evaluation and management mechanism to assist the control plane to judge and select the flow rules or network policies provided the applications.

Fine-grained flow rule selection: The priority of the application may be calculated based on the trust value of the application. It is also flexible to involve other impact factors into the calculation. Thus, fine-grained flow rule selection can be supported by the embodiments of the disclosure.

Scalability: The embodiments can support multiple control planes and also big data. The application ID is attached into the data collected by the probes, which greatly improve trust evaluation efficiency even though a huge volume of data is collected by the TE module 102.

Trustworthiness: The network performance monitoring is performed in a trustworthy way by applying a trust sustainment and control mechanism. The trust of the data provided by the probes can be authenticated between the TE module 102 and the NPM module 104. Only the data from a trusted probe can be used in the stage of trust evaluation. The control plane verifies the trust value of an application when the application provides flow rules to the control plane. Only trusted application is eligible to issue the network policy. The final selection of a network policy is based on the trust value of the application. The most trustworthy application's network policy can be finally selected and applied.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In any case, it should be understood that the components illustrated in this disclosure may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. It will be further understood that the terms "comprises", "containing" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method for trust management in software defined networking, comprising:
    collecting, by an apparatus in a software defined networking system, network performance results after a network policy, issued by a software defined networking application of another apparatus in the software defined networking system over a secure channel, is applied;
    collecting a feedback for the network policy; and
    calculating a trust value of the software defined networking application based at least partly on the network performance results and the feedback.

2. The method according to claim 1, further comprising:
    determining whether at least one network performance monitor is in a trusted status, wherein the network performance results are monitored by the at least one network performance monitor; and
    discarding network performance results of a network performance monitor when the network performance monitor is not in a trusted status.

3. The method according to claim 2, wherein the at least one network performance monitor is located in a data plane of software defined networking and managed by a network performance monitor apparatus, and a trust sustainment and control protocol is applied between the network performance monitor apparatus and the at least one network performance monitor.

4. The method according to claim 1, wherein the network performance results are signed by a network performance results' provider.

5. The method according to claim 1, wherein an identity of the application is added in the network performance results by a network performance results' provider.

6. The method according to claim 1, further comprising:
    receiving, from at least one control plane of the software defined networking, an identity of the application and a time duration of the network policy; and
    adding an identity of the application to the network performance results by matching a time duration with a time of network performance monitoring.

7. The method according to claim 1, further comprising:
    signing the trust value; and
    providing the signed trust value to the application and/or at least one control plane of the software defined networking.

8. An apparatus for trust management in a software defined networking system, comprising:
    at least one processor;
    at least one memory including computer program code, the memory and the computer program code configured to, with the at least one processor, cause the apparatus to:
    collect network performance results after a network policy issued by a software defined networking application of another apparatus in the software defined networking system over a secure channel is applied;
    collect a feedback for the network policy; and
    calculate a trust value of the application based at least partly on the network performance results and the feedback.

9. The apparatus according to claim 8, wherein the memory and the computer program code are further configured to, with the at least one processor, cause the apparatus to:
    determine whether at least one network performance monitor is in a trusted status, wherein the network performance results are monitored by the at least one network performance monitor; and
    discard network performance results of a network performance monitor when the network performance monitor is not in a trusted status.

10. The apparatus according to claim 9, wherein the at least one network performance monitor is located in a data plane of software defined networking and managed by a network performance monitor apparatus, and a trust sustainment and control protocol is applied between the network performance monitor apparatus and the at least one network performance monitor.

11. The apparatus according to claim 8, wherein the network performance results are signed by a network performance results' provider.

12. The apparatus according to claim 8, wherein an identity of the application is added in the network performance results by a network performance results' provider.

13. The apparatus according to claim 8, wherein the memory and the computer program code are further configured to, with the at least one processor, cause the apparatus to:
receive, from at least one control plane of software defined networking, an identity of the application and a time duration of the network policy; and
add an identity of the application to the network performance results by matching a time duration with a time of network performance monitoring.

14. The apparatus according to claim 8, wherein the network performance results comprise at least one of throughput rate, packet loss probability and time delay.

15. The apparatus according to claim 8, wherein the memory and the computer program code are further configured to, with the at least one processor, cause the apparatus to:
sign the trust value; and
provide the signed trust value to the application and/or at least one control plane of the software defined networking.

16. An apparatus for trust management in a software defined networking system, comprising:
at least one processor;
at least one memory including computer program code, the memory and the computer program code configured to, with the at least one processor, cause the apparatus to:
receive, over a secure channel, a network policy issued by a software defined networking application of another apparatus in the software defined networking system;
obtain a trust value of the application, wherein the trust value is calculated by a trust evaluation apparatus based at least partly on network performance results and a feedback for the network policy;
determine whether the trust value is higher than a threshold value;
in response to a positive determination, check whether the network policy conflicts with an applied network policy;
when the network policy conflicts with the applied network policy, determine whether to apply the network policy based on a priority of the application; or
when the network policy does not conflict with the applied network policy, apply the network policy.

17. The apparatus according to claim 16, wherein the memory and the computer program code are further configured to, with the at least one processor, cause the apparatus to:
calculate a priority of the application based at least partly on the trust value.

18. The apparatus according to claim 16, wherein the memory and the computer program code are further configured to, with the at least one processor, cause the apparatus to:
check whether the network policy conflicts with the applied network policy based on at least one of a source IP address, a destination IP address, a source port and a destination port.

19. The apparatus according to claim 16, wherein the memory and the computer program code are configured to, with the at least one processor, cause the apparatus to:
when the priority of the application is higher than a priority of the applied network policy, replace the applied network policy with the network policy;
when the priority of the application is lower than the priority of the applied network policy, reject the network policy; or
when the priority of the application is equal to the priority of the applied network policy, send the applied network policy and the network policy to a network administrator for final decision or apply a decisive rule to automatically set a network policy in this situation.

20. The apparatus according to claim 16, wherein the network policy is signed by the application and the trust value is signed by the trust evaluation apparatus.

* * * * *